US012732970B2

(12) United States Patent
Van Phan et al.

(10) Patent No.: US 12,732,970 B2
(45) Date of Patent: Sep. 8, 2026

(54) INTER-UE COORDINATION IN GROUPCAST TRANSMISSIONS

(71) Applicant: Nokia Technologies Oy, Espoo (FI)

(72) Inventors: Vinh Van Phan, Oulu (FI); Ling Yu, Espoo (FI); Lianghai Ji, Aalborg (DK); Nuno Manuel Kiilerich Pratas, Aalborg (DK); Daniel Medina, Munich (DE); Torsten Wildschek, Gloucester (GB)

(73) Assignee: Nokia Technologies Oy, Espoo (FI)

( * ) Notice: Subject to any disclaimer, the term of this patent is extended or adjusted under 35 U.S.C. 154(b) by 194 days.

(21) Appl. No.: 18/559,552

(22) PCT Filed: Mar. 24, 2022

(86) PCT No.: PCT/EP2022/057759
§ 371 (c)(1),
(2) Date: Nov. 7, 2023

(87) PCT Pub. No.: WO2022/238035
PCT Pub. Date: Nov. 17, 2022

(65) Prior Publication Data

US 2024/0267893 A1 Aug. 8, 2024

(30) Foreign Application Priority Data

May 10, 2021 (FI) ..................................... 20215548

(51) Int. Cl.
*H04W 72/04* (2023.01)
*H04L 1/1812* (2023.01)

(52) U.S. Cl.
CPC ........... *H04W 72/04* (2013.01); *H04L 1/1812* (2013.01)

(58) Field of Classification Search
CPC .... H04W 72/04; H04L 1/1812; H04L 5/0037; H04L 5/0055; H04L 2001/0092;
(Continued)

(56) References Cited

U.S. PATENT DOCUMENTS 7,984,356 B2 7/2011 Chindapol et al.
2021/0127403 A1 4/2021 Ryu et al.
(Continued)

FOREIGN PATENT DOCUMENTS

WO 2019/097476 A1 5/2019
WO 2020/093328 A1 5/2020
(Continued)

OTHER PUBLICATIONS

Office action received for corresponding Finnish Patent Application No. 20215548, dated Dec. 9, 2021, 6 pages.
(Continued)

*Primary Examiner* — Abdullahi Ahmed
(74) *Attorney, Agent, or Firm* — .Lippes Mathias LLP

(57) ABSTRACT

Apparatus and method for inter-UE coordination in groupcast transmissions are provided. Solution comprises communicating (400) with a group of apparatuses in a group communication utilising sidelink transmission, where the group of apparatuses comprises a second apparatus configured to coordinate resource allocation for the group communication and at least one other first apparatus; transmitting (402), utilising a designated hybrid automatic repeat request process, an inter-UE coordination request. Positive or negative hybrid automatic repeat request acknowledgements are received (404) from the group of apparatuses in response to transmitting the inter-UE coordination request and monitoring of inter-UE coordination requests of the at
(Continued)

least one other first apparatus are monitored (406) based on the received acknowledgements from the at least one other first apparatus.

20 Claims, 4 Drawing Sheets

(58) Field of Classification Search
CPC ..... H04L 2001/0093; H04L 2001/0097; H04L 1/189; H04L 1/1854
See application file for complete search history.

(56) References Cited

U.S. PATENT DOCUMENTS

2022/0095326 A1* 3/2022 Li .......................... H04L 1/1896
2022/0183002 A1* 6/2022 Yeo ........................ H04L 1/1854
2022/0337349 A1* 10/2022 Lee .......................... H04W 4/40
2023/0056574 A1* 2/2023 Hwang ................. H04W 72/25
2023/0141004 A1* 5/2023 Hong ................ H04W 72/1263
370/311
2023/0224927 A1* 7/2023 Shin ...................... H04W 72/25
370/329
2023/0239900 A1* 7/2023 Park ...................... H04W 36/06
370/329
2023/0337192 A1* 10/2023 Farag .................... H04L 1/1671
2024/0015755 A1* 1/2024 Pan ........................ H04W 72/25
2024/0073875 A1* 2/2024 Leon Calvo .......... H04W 72/25
2024/0073930 A1* 2/2024 Khoryaev ............. H04W 72/20
2024/0080866 A1* 3/2024 Luo ........................ H04W 72/25
2024/0224297 A1* 7/2024 Shin ...................... H04W 76/14

FOREIGN PATENT DOCUMENTS

WO 2020/184955 A1 9/2020
WO 2022/233473 A1 11/2022

OTHER PUBLICATIONS

"Discovery Procedure and Connection Setup Procedure in NR Sidelink", 3GPP TSG-RAN WG2 Meeting #103bis, R2-1813731, Agenda: 11.4.2.3, CATT, Oct. 8-12, 2018, 4 pages.
International Search Report and Written Opinion received for corresponding Patent Cooperation Treaty Application No. PCT/EP2022/057759, dated Jul. 6, 2022, 16 pages.
"Views on resource allocation enhancements for sidelink communication", 3GPP TSG RAN WG1 Meeting #104-e, R1-2100047, Agenda: 8.11.1.2, FUTUREWEI, Jan. 25-Feb. 5, 2021, 6 pages.
"Feature lead summary for AI 8. 11.1.2 Inter-UE coordination for Mode 2 enhancements", 3GPP TSG RAN WG1 #104bis-e, R1-2104103, Agenda: 8.11.1.2, LG Electronics, Apr. 12-20, 2021, pp. 1-75.
"3rd Generation Partnership Project; Technical Specification Group Radio Access Network; NR; NR and NG-RAN Overall Description; Stage 2 (Release 17)", 3GPP TS 38.300, V17.5.0, Jun. 2023, pp. 1-211.
"WID revision: NR sidelink enhancement", 3GPP TSG RAN Meeting #90e, RP-202846, Agenda: 9.8.3, LG Electronics, Dec. 7-11, 2020, 6 pages.
"Inter-UE coordination for Mode 2 enhancements", 3GPP TSG RAN WG1 #106-e, R1-2106532, Agenda: 8.11.1.2, Nokia, Aug. 16-27, 2021, 22 pages.
Annex to EPO Form 2004 pursuant to Rule 71(3) EPC, Biblical data of EPO App. No. 22 718 131.0, dated Jan. 4, 2026, 2 pages.
EPO Communication Under Rule 71(3) EPC corresponding European Patent Application No. 22 718 131.0, dated Jan. 4, 2026, 5 pages.
3GPP TSG-RAN WG1 Meeting #102-e e-Meeting, R1-2006445, Ericcson, Aug. 17-28, 2020, 7 pages.
Amended Description corresponding to European Patent Application No. 22 718 131.0, dated Feb. 25, 2026, 31 pages.
European Patent Office communication corresponding to European Patent Application No. 22 718 131.0, dated Jan. 4, 2026, 1 page.

* cited by examiner

INTER-UE COORDINATION IN GROUPCAST TRANSMISSIONS

RELATED APPLICATION

This application was originally filed as PCT Application No. PCT/EP2022/057759, filed on Mar. 24, 2022, which claims priority from FI application No. 20215548, filed on May 10, 2021, each of which is incorporated herein by reference in its entirety.

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. Wireless communication amongst vehicles has been under study during recent years. Vehicular connectivity over cellular technology, such as cellular system developed by Third Generation Partnership Project, 3GPP, is denoted as Cellular Vehicle to Everything, C-V2X. It is being standardized along with the development of 5G (or New Radio, NR) communication system. Direct Vehicle to Vehicle communication without a link via a Radio Access Network, RAN, node, is denoted as sidelink.

In sidelink, terminal devices may communicate with each other directly without going through a base station or cellular node. In 5G, the sidelink air interface is called PC5 interface. Sidelink communications have been proposed to be used in connection with Public Safety and Intelligent transportation systems, ITS, which is designed to improve road safety and traffic efficiency. Communication between vehicles and between infrastructure is a vital part of ITS. Vehicle-to-vehicle communication, V2V, vehicle-to-infrastructure communication, V2I, and Vehicle to Everything, V2X, will enable communication related to various use cases, such as broadcasting situation awareness messages for assisted driving, sending emergency alerts (braking and vulnerable road user detection, for example) to increase safety, executing cooperative manoeuvres such as lane merging or platooning and more. However, the use of sidelink is not limited to above examples.

In sidelink communication, the terminal may communicate with another terminal device (unicast), or with multiple terminal devices (broadcast, groupcast).

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there are provided apparatuses of claims 1 and 9.

According to an aspect of the present invention, there are provided methods of claims 12 and 13.

According to an aspect of the present invention, there is provided computer program of claims 14 and 15.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB)

technology, sensor networks, mobile ad-hoc networks (MANETs) and Internet Protocol multimedia subsystems (IMS) or any combination thereof.

Figure 1:
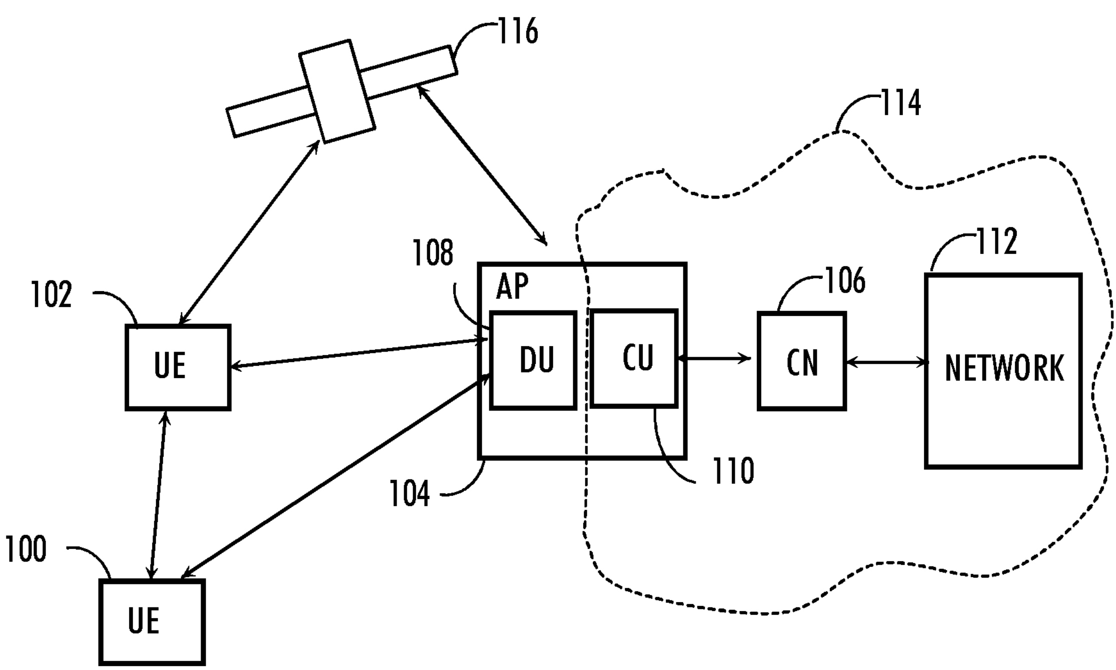

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc.

The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHZ, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHZ—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
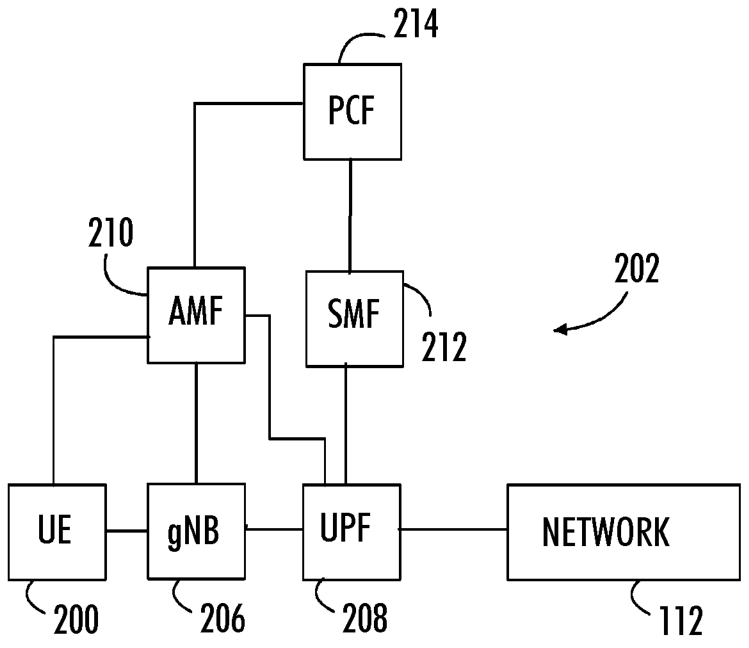

FIG. 2 illustrates an example of a communication system based on 5G network components. A user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions.

In sidelink communication, the terminal devices communicate with each other without going through a base station or cellular node. The communication may be between a terminal device to another (unicast), or from one terminal device to many (broadcast, groupcast). Thus, a transmitting terminal device may transmit sidelink information to a receiving terminal device or a group of receiving terminal devices or all terminal devices in proximity of transmitting terminal device.

Sidelink may be operated in different modes. In mode 1, the network, such as serving NodeB, reserves and allocates resources for sidelink communication of terminal devices. This means that a transmitting terminal device may need to be in RRC CONNECTED state of the serving NodeB in order to get Mode 1 resources allocated. In mode 2, resources are selected without the control of a serving NodeB. The resource allocation may be based on autonomous selection of transmission resources from a preconfigured transmission resource pool by the transmitting terminal device. The selection may be based on a sensing procedure or a random selection procedure Mode 2 can be used for the transmitting terminal device being in coverage (IC) or out-of-coverage (OoC); in RRC IDLE, RRC INACTIVE or RRC CONNECTED state.

In a sidelink groupcast between a group of terminal devices, there may be a given terminal device of the group of terminal devices which coordinates communication resources in the sidelink groupcast for other terminal devices of the group. This is referred to as inter-UE coordination for sidelink groupcast.

Figure 3:
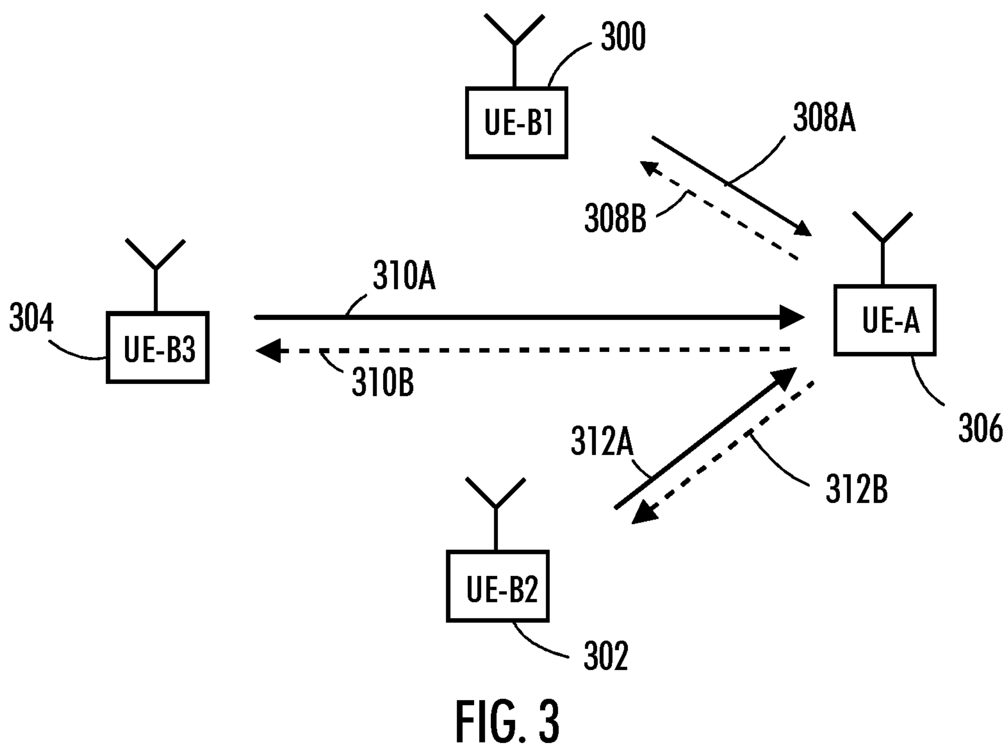
FIG. 3 illustrates an example of sidelink communication.

FIG. 3 illustrates an example of sidelink communication. In the figure, a terminal device or UE-B1 300 is communicating with a group of terminal devices UE-B2 302, UE-B3 304, and UE-A 306 utilising groupcast. In this example there are four terminal devices participating in the groupcast, but the number of terminal devices may be any other as well. In the example of FIG. 3, terminal device UE-A 306 provides the inter-UE coordination in the groupcast. The terminal device UE-A 306 coordinates resource allocation in Mode 2 for other members of the group. The purpose is to provide suitable resources (e.g. best suitable resources) for sidelink communications of the group as well as resolve resource conflicts of individual members of the group, such as potential collision and half-duplex issues.

The members of the group may transmit an inter-UE coordination request 308A, 310A, and 312A to the terminal device UE-A 306. The terminal device UE-A 306 may respond with a coordination message 308B, 310B, and 312B. It is assumed that the request and coordination messages are groupcast within the group (although in FIG. 3 the inter-UE coordination requests and the coordination messages in response to the inter-UE coordination requests are shown as arrows between group members UE-B # and the coordinating UE-A 306, for clarity). Thus, some or all the members of the group may receive these requests and coordination messages. I.e. at least it may be possible for UEs in the group to receive requests sent by others and responses sent by UE-A. However, reception may depend on e.g. radio conditions.

It is possible that the terminal devices UE-B1 300, UE-B2 302, UE-B3 304, and UE-A 306 utilising groupcast in communication with each other may also have other sidelink communications with other terminal devices or groups outside the group of FIG. 3. Assume here that terminal device UE-B1 300 transmits a coordination request 308A to UE-A 306 (which may be received by all participants of the group). The request from UE-B1 to UE-A may consider the needs for sidelink communications not only with the members inside the group of FIG. 3 but also regarding possible communication with other terminal devices or groups of terminal devices outside the group of FIG. 3.

In an embodiment, the coordination request 308A transmitted by UE-B1 300 may indicate, for example, resources such as time slots or intervals which are preferable or not preferable to UE-B1 300 to transmit or receive to or from UE-A 306 and/or other members of the group UE-B2 302 and UE-B3 304. This may be determined by UE-B1 based on up-to-date received requests from other UE-B # members and coordination messages from UE-A. In an embodiment, the coordination message 308B from UE-A may allocate resources for one or more UE-B members of which the request(s) are received in the same requesting time window. In an embodiment, the request 308A indicates both preferable and not preferable resources (i.e. radio resources) to the UE-B1 300.

The inter-UE coordination of the group should be reliable and efficient. In an embodiment, hybrid automatic repeat request, HARQ, process with feedback may be used for transmitting the request and coordination messages to increase reliability, especially if these messages are realised with Layer 2 or Layer 3 signalling. In case these messages are included in Sidelink Control Information, SCI Layer 1 signalling, HARQ may still be used by setting the transport block either empty or dummy.

Figure 4A:
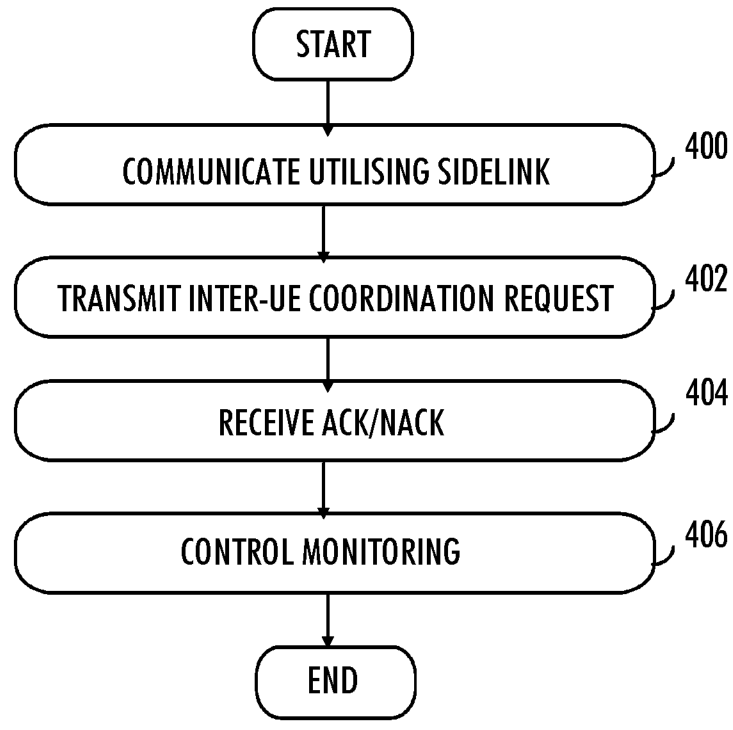
FIGS. 4A and 4B are flowcharts illustrating some embodiments.

The flowchart of FIG. 4A illustrates an embodiment. The flowchart illustrates an example of the operation of a first apparatus. In an embodiment, the first apparatus may be a terminal device, user equipment, a part of a terminal device or any other apparatus capable of executing following steps. In an embodiment, the first apparatus is terminal device UE-B1 300 of FIG. 3.

In step 400, the apparatus is configured to communicate with a group of apparatuses in a group communication utilising sidelink transmission, where the group of apparatuses comprises a second apparatus configured to coordinate resource allocation for the group communication and at least one other first apparatus In an embodiment, the second apparatus is terminal device UE-A 306.

In step 402, the first apparatus is configured to transmit, utilising a designated hybrid automatic repeat request process, an inter-UE coordination request. The designated hybrid automatic repeat request (HARQ) process is based on HARQ with dedicated feedback enabled for sidelink groupcast. For example, the inter-UE coordination request may be targeted to the second apparatus.

The first apparatus is configured to monitor coordination messages from the second apparatus of the group. In an embodiment, the first apparatus is also configured to monitor resource coordination requests from at least one other first apparatuses of the group.

In step 404, the first apparatus is configured to receive positive or negative hybrid automatic repeat request acknowledgements from the group of apparatuses in response to transmitting the inter-UE coordination request. For example, the ACKs and/or NACKs may be received from the second apparatus and the at least one other first apparatus.

In an embodiment, the first apparatus performs a HARQ retransmission for the designated HARQ process based on NACK received from the second apparatus, UE-A 306 in the example of FIG. 3 and not based on NACK received from the other apparatuses of the group, UE-B2 302 and UE-B3 304 in the example of FIG. 3. The apparatus terminates the designated HARQ process based on ACK received from the second apparatus (i.e. UE-A 306) of the group. At this point it is noted that the at least one other first apparatus may refer to other apparatuses of the group, such as UE-B2 302 and UE-B3 304. In some examples, the at least one other first apparatus may be referred to as at least one other apparatus or at least one third apparatus. The group of apparatuses may comprise, for example, the first apparatus (e.g. UE-B1 300), the second apparatus (e.g. UE-A 306), and at least one other apparatus (e.g. UE-B2 302 and/or UE-B3 304). So, NACK received by the first apparatus from the second apparatus may cause the first apparatus to perform said HARQ retransmission for the designated HARQ process, and ACK received from the second apparatus may cause the first apparatus to terminate said designated HARQ process. However, NACK(s) received, as a response to the coordination request of step 402, from the at least one other first apparatus (e.g. UE-B2 302 and/or UE-B3 304) may not trigger the first apparatus perform said HARQ retransmission.

In step 406, the first apparatus is configured to control monitoring of inter-UE coordination requests of the at least one other first apparatus based on the received acknowledgements from the at least one other first apparatus.

In an embodiment, the first apparatus is configured to monitor coordination request of another first apparatus of the group if the HARQ acknowledgement received from the other first apparatus was negative, i.e., NACK.

In an embodiment, the first apparatus is configured not to monitor coordination request of another first apparatus of the group if the HARQ acknowledgement received from the other first apparatus was positive, i.e., ACK.

So, for example, if UE-B2 302 sends NACK to UE-B1 300 in response to the inter-UE coordination request (e.g. transmitted in block 402) and the UE-B1 300 receives the NACK (e.g. block 404), the UE-B1 300 may monitor or continue monitoring coordination requests transmitted by the UE-B2 302. However, if ACK is received instead (e.g. in block 404), the UE-B1 300 may stop monitoring inter-UE coordination requests transmitted by the apparatus which transmitted the ACK (i.e. in this case UE-B2 302). Similar logic may be applied to all other apparatuses of the group, excluding the second apparatus, for example. Thus, beneficially, by obtaining responses from different members of the group of apparatuses, the first apparatus may control its monitoring resources, and thus optimize e.g. its power usage. For example, if UE-B2 302 indicates ACK, the UE-B1 300 may stop monitoring UE-B2's 302 inter-UE coordination requests, and thus save energy. However, for example, UE-B1 300 may continue monitoring inter-UE coordination requests transmitted by those apparatuses of the group (e.g. UE-B3 304) from which it received a NACK.

In an embodiment, the first apparatus is configured to keep monitoring coordination request of another first apparatus of the group if the HARQ acknowledgement received from the other first apparatus was positive, i.e., ACK. However, the apparatus may take next coordination request from the other first apparatus into account when deciding its own next coordination request.

Thus, a method is proposed where an HARQ process is utilised for giving feedback on the inter-UE coordination request. The feedback (from another group member (e.g. UE-B2 302 and/or UE-B3 304 of FIG. 3) or the configurator of the group (e.g. UE-A 306 of FIG. 3) may be utilised in the control on the transmitter of the request.

Thus, if a group member, such as UE-B1 for example, receives a positive acknowledgement ACK from another group member, for example UE-B2, UE-B1 may skip monitoring the request from UE-B2 in the future. It is noted again that ACK received from UE-A may cause different action as explained above.

In an embodiment, the monitoring may be skipped as long as UE-B1 does not detect a conflict with the resource allocation of UE-B2 based on monitoring coordination messages sent from the coordinating group member UE-A. UE-B1 may detect a conflict, for example, if UE-A transmits a coordination message to UE-B2 via either a resource not included in UE-B1's indicated preferred resources or a resource included in UE-B1's indicated non-preferred resources. If a conflict is detected UE-B1 may transmit a new coordination request to UE-A and resume monitoring inter-UE coordination request from UE-B2. This may happen even though UE-B2 had earlier provided an ACK feedback to a coordination request transmitted by UE-B1.

In an embodiment, UE-B1 may resume monitoring of inter-UE coordination request of a group member that sent an ACK if there are changes related to UE-B1's sidelink communications with other group members or with other UEs or groups of UEs outside the group.

In an embodiment, if UE-B1 detects a conflict regarding an inter-UE coordination request sent by UE-B2, and the UE-B1 deems that the provided NACK feedback to UE-B2 is not enough, then UE-B1 may decide to perform a new inter-UE coordination request (with updated indicated resources, selected based on the monitoring of UE-B2 inter-UE coordination messages).

In an embodiment, in case UE-B1 receives neither NACK nor ACK from UE-B2 or, that is, UE-B1 receives or detects a discontinuous transmission (DTX) as HARQ feedback from UE-B2, UE-B1 may be configured to determine whether UE-B2 skips reception of the request from UE-B1 because UE-B2 already received previous inter-UE coordination request from UE-B1 or because UE-B1 has sent earlier an ACK to UE-B2 regarding UE-B2's inter-UE coordination request or for other reason. Based on this, UE-B1 may determine to keep or skip monitoring the request from UE-B2 in the future.

In an embodiment, the number of allocated HARQ feedback resources can be selected in such a manner that more than a binary feedback can be provided. For example, a third state can be included in the set of feedback responses that could indicate that no inter-UE coordination requests will be accepted by UE-A during a predefined period.

Figure 4B:
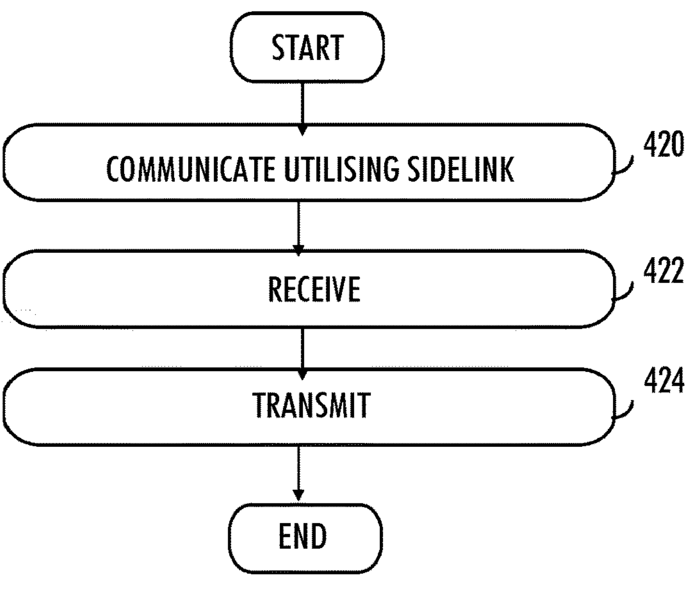

The flowchart of FIG. 4B illustrates an example of the operation of an apparatus. In an embodiment, the apparatus may be a terminal device, user equipment, a part of a terminal device or any other apparatus capable of executing following steps. In an embodiment, the apparatus is terminal device UE-B2 302 or UE-B3 304 of FIG. 3.

In step 420, the apparatus is configured to communicate with a group of apparatuses in a group communication utilising sidelink transmission, where the group of apparatuses comprises a second apparatus (e.g. UE-A 306 of FIG. 3) configured to coordinate resource allocation for the group communication and at least one other apparatus.

In step 422, the apparatus is configured to detect an inter-UE coordination request from a first apparatus (e.g. UE-B1 300 of FIG. 3) among at least one other apparatus of the group, the inter-UE coordination request is transmitted utilising a designated hybrid automatic repeat request process. The detection may include the following options. In a first option, the detection is based on only the received sidelink control information (SCI) that indicates that the first apparatus, UE-B1 300, is transmitting a sidelink transport block to the group utilising the designated HARQ process. This implies that the sidelink transport block is carrying an inter-UE coordination request of UE-B1. The apparatus skips the reception of the sidelink transport block and therefore skips the reception of the inter-UE coordination request of UE-B1. In a second option, the detection is based on the reception of both the SCI and the sidelink transport block carrying the inter-UE coordination request of UE-B1, as scheduled by the SCI utilising the designated HARQ process. In a third option, the detection, further than the second option, is based on the reception of the inter-UE coordination request of UE-B1. That is, the apparatus receives not only the sidelink transport block carrying the inter-UE coordination request of UE-B1 correctly but also the contents of the inter-UE coordination request of UE-B1 including preferred or non-preferred resources of UE-B1, as indicated in the inter-UE coordination request of UE-B1.

In step 424, the apparatus is configured to, in response to the detected coordination request, transmit a negative hybrid automatic repeat request acknowledgement based at least on determining a need to transmit an inter-UE coordination request by the apparatus.

Assume here that UE-B1 300 transmitted an inter-UE coordination request. In an embodiment, UE-B2 302 may send an ACK or a NACK feedback to UE-B1 upon receiving the HARQ transport block carrying the request from UE-B1 using the designated HARQ process, regardless of whether the HARQ transport block and therefore the request is received correctly or not at UE-B2. For example, UE-B2 may send a NACK to UE-B1 even if the request was received correctly. This may be the case when UE-B2 is configured to determine that UE-B1 should monitor an upcoming inter-UE coordination request from UE-B2. In an embodiment, UE-B2 may send an ACK to UE-B1 to the first HARQ transmission of the HARQ transport block carrying the request from UE-B1 even when UE-B2 skips receiving the request from UE-B1. This may correspond to the case that UE-B2 has no data to transmit to the group for a foreseeable future or, i.e., UE-B2 is currently operating as a passive listener of the group.

In an embodiment, UE-B2 may send the NACK if there is some conflict in preferred or non-preferred resources between UE-B1 and UE-B2. In an embodiment, the conflict may be detected if resources are at least partially overlapping. For example, if preferred resources at least partially overlap, the UE-B2 may send NACK. UE-B2 may know its own resources (e.g. those indicated in to-be-transmitted or already transmitted inter-UE coordination request) and determine the resources of the UE-B1 based on the inter-UE coordination request transmitted by the UE-B1. In another embodiment, conflict is determined if resources are not overlapping. That is, in some cases it is beneficial that resources should fully or at least partially overlap. In this case, if overlap is not detected, NACK may be transmitted. Otherwise, UE-B2 may send the ACK at least in some embodiments. That is, for instance, UE-B2 may transmit ACK if conflict is not determined.

In an embodiment, UE-B2 302 may send a NACK feedback to UE-B1 upon successfully receiving the HARQ transport block carrying the request from UE-B1 using the designated HARQ process. The NACK is determined by UE-B2 after decoding the inter-UE coordination request from UE-B1 based on preferred or not preferred resources indicated in the received request from UE-B1. This option may require cross-layer operation and sufficient HARQ round-trip time including the processing time of successfully received HARQ transport block.

In an embodiment, a NACK is transmitted by UE-B2 normally as in the HARQ operation if the transport block carrying the inter-UE coordination request from UE-B1 was not received correctly. In such a case UE-B1 will monitor future inter-UE coordination request from UE-B2.

The proposed solution has many advantages. It enables the group members to provide feedback in an efficient manner. It allows a group member to control its behaviour when monitoring inter-UE coordination requests of other group members. Further, the feedback process makes it possible for a group member to retransmit its inter-UE coordination message if the original request was not deemed acceptable by the terminal device coordinating the group resources. The group members may also have a need to communicate with each other, either directly or as a part of the groupcast sidelink. Thus, knowing what may be preferable or non-preferable resources of each other apparatus, based on the configuration messages, may also provide flexibility for the members to select resources for sidelink transmissions between them.

Figure 5:
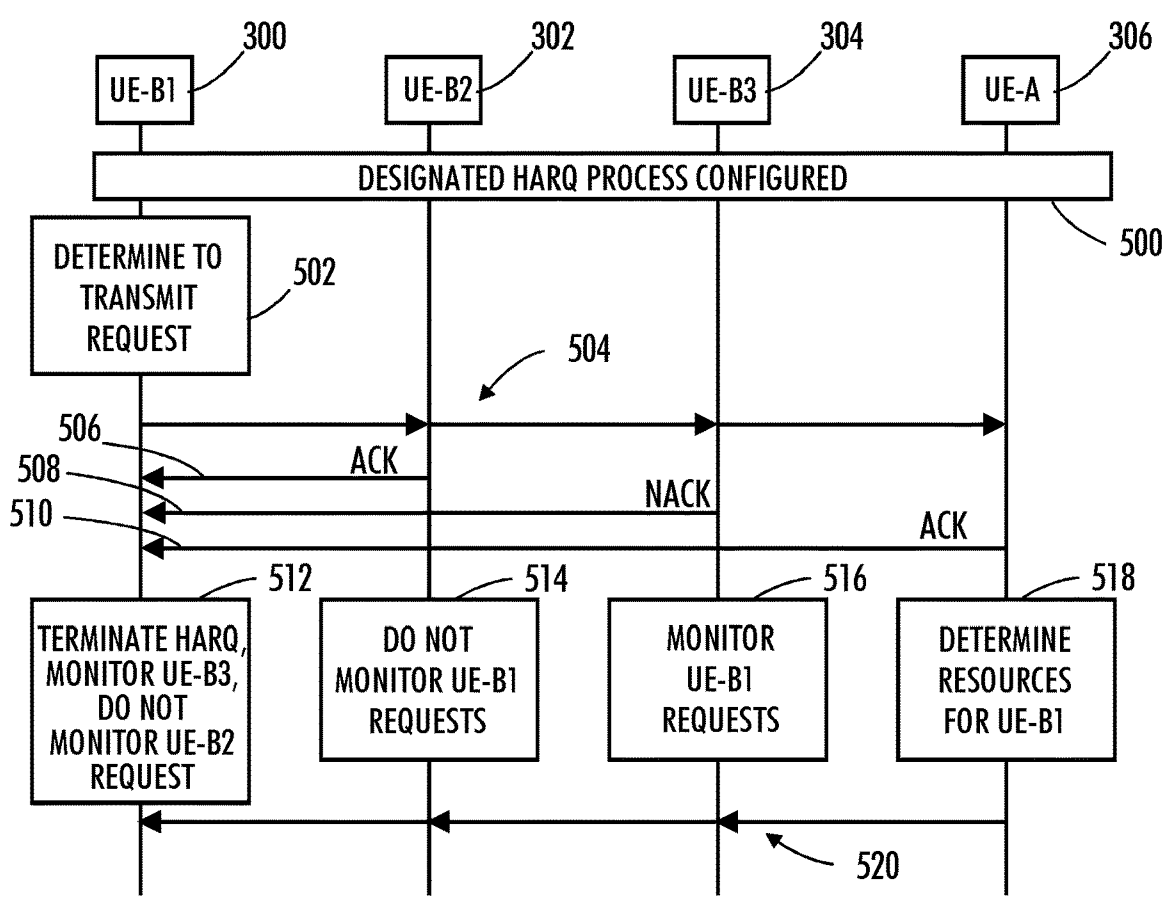
FIG. 5 is a chart illustrating an embodiment.

FIG. 5 is a chart illustrating an embodiment. The figure illustrates a situation where designated hybrid automatic repeat request process 500 with feedback enabled is applied in the transmission of inter-UE coordination requests and coordination messages.

In an embodiment, the terminal devices UE-B1 300, UE-B2 302, and UE-B3 304 receive designated HARQ process configuration from UE-A 306 which coordinates resource allocation in mode 2 for the group communication. In an embodiment, the designated HARQ process may be pre-defined and configured to all terminal device groups for inter-UE coordination.

In step 502, UE-B1 300 determines a need to transmit an inter-UE coordination request to UE-A 306. The request 504 is transmitted utilising the designated hybrid automatic repeat request process. In this example, UE-B2 302 and UE-A 306 respond with a positive acknowledgement ACK 506, 510 and UE-B3 306 responds with a negative acknowledgement NACK 508.

Based on the received acknowledgements UE-B1 controls monitoring of inter-UE coordination requests of other apparatuses of the group.

Based on the received positive acknowledgement from UE-A 306, UE-B1 300 is configured to terminate 512 the HARQ process. It is noted that the HARQ process in terminated even if NACK is received from UE-B3, as UE-B1 performs HARQ retransmission for the designated HARQ process only based on NACK from the coordinating UE-A. Based on the received positive acknowledgement from UE-B2 302, UE-B1 300 is configured to skip monitoring requests from UE-B2 302, as it can safely assume that UE-B2 302 receives the request 504 and can take it into account (e.g. resources, preferred and/or non-preferred, indicated in the request 504) when sending UE-B2's own request. Further, based on the received negative acknowledgement from UE-B3 304, UE-B1 300 is configured to monitor further/future inter-UE coordination request from UE-B3 304. It may be that UE-B3 did not receive the request 504 or sent a NACK for another reason mentioned above.

UE-B2 302 transmitted a positive acknowledgement ACK 506 as a feedback response to the request received from UE-B1 300. UE-B2 302 is configured to skip 514 monitoring further inter-UE coordination request from UE-B1 300.

In an embodiment, skipping monitoring the inter-UE coordination request from UE-B1 at another group member, for example at UE-B2, denotes that if UE-B2 receives Sidelink Control Information, SCI, of a groupcast sidelink transmission for the group and the SCI indicates that the designated HARQ process from UE-B1 is being used then UE-B2 is configured to skip further reception of the sidelink HARQ (re)transmission as well as transmission of HARQ feedback to UE-B1.

UE-B3 304 transmitted a negative acknowledgement NACK 508 as a feedback response to the request received from UE-B1 300. UE-B3 304 is configured to monitor 516 further coordination requests from UE-B1 300.

UE-A 306 transmitted a positive acknowledgement ACK 510 as a feedback response to the request received from UE-B1 300. UE-A 306 is configured to determine 518 resource allocation for UE-B1 300 and transmit a coordination message 520 in response to the coordination request from UE-B1.

In an embodiment, UE-A may set or reset the monitoring of inter-UE coordination requests of the members of the group. UE-A may instruct the terminal devices to keep monitoring or to skip monitoring of inter-UE coordination requests for one or more members of the group.

In an embodiment, the coordination message 520 from UE-A may indicate the resource allocation for UE-A to receive inter-UE coordination requests or to send coordination messages from/to one or more group members. The group members are configured to take this into account when transmitting inter-UE coordination requests or receiving coordination messages.

Figure 6:
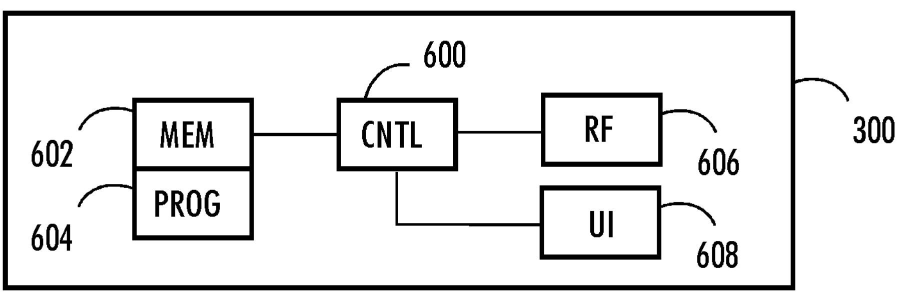
FIG. 6 illustrates an example of an apparatus.

FIG. 6 illustrates an embodiment. The figure illustrates a simplified example of an apparatus applying embodiments of the invention. In some embodiments, the apparatus may be a terminal device 300, 302, 304, or a part of a terminal device of a telecommunication system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 300 of the example includes a control circuitry 600 configured to control at least part of the operation of the apparatus.

The apparatus may comprise a memory 602 for storing data. Furthermore, the memory may store software 604 executable by the control circuitry 600. The memory may be integrated in the control circuitry.

The apparatus may comprise one or more interface circuitries 606, 608. The interface circuitries are operationally connected to the control circuitry 600. An interface circuitry 606 may be a set of transceivers configured to communicate with a RAN node, such as an (e/g) NodeB of a wireless communication network, or communicate utilising sidelink communication with a terminal device. The interface circuitry may be connected to an antenna arrangement (not shown). The apparatus may also comprise a connection to a transmitter instead of a transceiver. The apparatus may further comprise a user interface 608.

In an embodiment, the software 604 may comprise a computer program comprising program code means adapted to cause the control circuitry 600 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides an apparatus comprising means for communicating with a group of apparatuses in a group communication utilising sidelink transmission, where the group of apparatuses comprises a second apparatus configured to coordinate resource allocation for the group communication and at least one other first apparatus; means for transmitting, utilising a designated hybrid automatic repeat request process, an inter-UE coordination request; means for receiving positive or negative hybrid automatic repeat request acknowledgements from the group of apparatuses in response to transmitting the inter-UE coordination request; and means for controlling monitoring of inter-UE coordination requests of the at least one other first apparatus based on the received acknowledgements from the at least one other first apparatus.

An embodiment provides an apparatus comprising means for communicating with a group of apparatuses in a group communication utilising sidelink transmission, where the group of apparatuses comprises a second apparatus configured to coordinate resource allocation for the group communication and at least one other apparatus; means for detecting an inter-UE coordination request from a first apparatus among at least one other apparatus of the group, the inter-UE coordination request is transmitted utilising a designated hybrid automatic repeat request process; means for in response to the detected coordination request, transmitting a negative hybrid automatic repeat request acknowledgement based on determining a need to transmit an inter-UE coordination request by the apparatus.

An embodiment provides a computer program embodied on a distribution medium, comprising program instructions which, when loaded into an electronic apparatus, are configured to control the apparatus to execute at least the following: communicating with a group of apparatuses in a group communication utilising sidelink transmission, where the group of apparatuses comprises a second apparatus configured to coordinate resource allocation for the group communication and at least one other first apparatus; transmitting, utilising a designated hybrid automatic repeat request process, an inter-UE coordination request; receiving positive or negative hybrid automatic repeat request acknowledgements from the group of apparatuses in response to transmitting the inter-UE coordination request; and controlling monitoring of inter-UE coordination requests of the at least one other first apparatus based on the received acknowledgements from the at least one other first apparatus.

An embodiment provides a non-transitory computer readable medium comprising program instructions for causing an apparatus to perform at least the following: communicating with a group of apparatuses in a group communication utilising sidelink transmission, where the group of apparatuses comprises a second apparatus configured to coordinate resource allocation for the group communication and at least one other first apparatus; transmitting, utilising a designated hybrid automatic repeat request process, an inter-UE coordination request; receiving positive or negative hybrid automatic repeat request acknowledgements from the group of apparatuses in response to transmitting the inter-UE coordination request; and controlling monitoring of inter-UE coordination requests of the at least one other first apparatus based on the received acknowledgements from the at least one other first apparatus.

An embodiment provides a non-transitory computer readable medium comprising program instructions for causing an apparatus to perform at least the following: communicating with a group of apparatuses in a group communication utilising sidelink transmission, where the group of apparatuses comprises a second apparatus configured to coordinate resource allocation for the group communication and at least one other apparatus; detecting an inter-UE coordination request from a first apparatus among at least one other apparatus of the group, the inter-UE coordination request is transmitted utilising a designated hybrid automatic repeat request process; in response to the detected coordination request, transmitting a negative hybrid automatic repeat request acknowledgement based on determining a need to transmit an inter-UE coordination request by the apparatus.

An embodiment provides a computer program embodied on a distribution medium, comprising program instructions which, when loaded into an electronic apparatus, are configured to control the apparatus to execute at least the following: communicating with a group of apparatuses in a group communication utilising sidelink transmission, where the group of apparatuses comprises a second apparatus configured to coordinate resource allocation for the group communication and at least one other apparatus; detecting an inter-UE coordination request from a first apparatus among at least one other apparatus of the group, the inter-UE coordination request is transmitted utilising a designated hybrid automatic repeat request process; in response to the detected coordination request, transmitting a negative hybrid automatic repeat request acknowledgement based on determining a need to transmit an inter-UE coordination request by the apparatus.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A first apparatus comprising at least one processor; and at least one memory including computer program code, the at least one memory and computer program code configured to, with the at least one processor, cause the first apparatus to:

communicate with a group of apparatuses in a group communication utilizing sidelink transmission, where the group of apparatuses comprises a second apparatus configured to coordinate resource allocation for the group communication and at least one other first apparatus;

transmit, utilizing a designated hybrid automatic repeat request process configured by the second apparatus, an inter-UE coordination request;

receive positive or negative hybrid automatic repeat request acknowledgements from the group of apparatuses in response to transmitting the inter-UE coordination request; and control monitoring of inter-UE coordination requests of the at least one other first apparatus based on the received acknowledgements from the at least one other first apparatus, wherein the first apparatus monitors inter-UE coordination requests of the at least one other first apparatus if the acknowledgement received from the at least one other first apparatus was negative, and does not monitor inter-UE coordination requests of the at least one other first apparatus if the acknowledgement received from the at least one other first apparatus was positive;

wherein a negative acknowledgement received from the second apparatus causes the first apparatus to perform a retransmission for the designated hybrid automatic repeat request process, and a negative acknowledgement received from the at least one other first apparatus does not cause the first apparatus to perform a retransmission for the designated hybrid automatic repeat request process; and wherein a positive acknowledgement received from the second apparatus causes the first apparatus to terminate the designated hybrid automatic repeat request process.

2. The first apparatus of claim 1, the at least one memory and the computer program code configured to, with the at least one processor, cause the first apparatus further to:

receive an inter-UE coordination message from the second apparatus, as a response to the inter-UE coordination request.

3. The first apparatus of claim 1, the at least one memory and the computer program code configured to, with the at least one processor, cause the first apparatus further to:
   receive at least one inter-UE coordination request from the at least one other first apparatus; take the received at least one inter-UE coordination request into account in transmitting the inter-UE coordination request.

4. The first apparatus of claim 1, the at least one memory and the computer program code configured to, with the at least one processor, cause the first apparatus further to:
   monitor inter-UE coordination messages transmitted from the second apparatus to other apparatuses of the group; and
   take received one or more inter-UE coordination messages into account in transmitting the inter-UE coordination request.

5. The first apparatus of claim 1, the at least one memory and the computer program code configured to, with the at least one processor, cause the first apparatus further to:
   in addition to communicating with the group of apparatuses, communicate with one or more apparatuses belonging to one or more other groups of apparatuses utilizing sidelink transmission; take the communication with the one or more apparatuses belonging to the one or more other groups of apparatuses into account in transmitting the inter-UE coordination request.

6. The first apparatus of claim 1, the at least one memory and the computer program code configured to, with the at least one processor, cause the first apparatus further to:
   receive a configuration of the designated hybrid automatic repeat request process from the second apparatus.

7. The first apparatus of claim 1, the at least one memory and the computer program code configured to, with the at least one processor, cause the first apparatus further to:
   resume monitoring inter-UE coordination requests from the at least one other first apparatus that previously sent a positive acknowledgement, upon detecting a conflict based on a coordination message transmitted from the second apparatus to another apparatus of the group via a resource not included in the first apparatus's indicated preferred resources or via a resource included in the first apparatus's indicated non-preferred resources; and
   transmit a new inter-UE coordination request to the second apparatus.

8. The first apparatus of claim 7, the at least one memory and the computer program code configured to, with the at least one processor, cause the first apparatus further to:
   resume monitoring inter-UE coordination requests from the at least one other first apparatus that previously sent a positive acknowledgement, upon detecting changes in sidelink communications of the first apparatus with other group members or with other user equipments or groups of user equipments outside the group.

9. The first apparatus of claim 8, the at least one memory and the computer program code configured to, with the at least one processor, cause the first apparatus further to:
   upon resuming monitoring and detecting a conflict regarding an inter-UE coordination request from the at least one other first apparatus, and upon determining that a previously transmitted negative acknowledgement to the at least one other first apparatus is insufficient, transmit a new inter-UE coordination request with updated indicated resources selected based on the monitoring of inter-UE coordination requests from the at least one other first apparatus.

10. The first apparatus of claim 9, the at least one memory and the computer program code configured to, with the at least one processor, cause the first apparatus further to:
   upon detecting a discontinuous transmission as hybrid automatic repeat request feedback from the at least one other first apparatus, determine whether the at least one other first apparatus skipped reception based on a previously received inter-UE coordination request from the first apparatus or based on a previously sent positive acknowledgement from the first apparatus to the at least one other first apparatus; and
   based on the determination, keep or skip monitoring inter-UE coordination requests from the at least one other first apparatus.

11. The first apparatus of claim 10, the at least one memory and the computer program code configured to, with the at least one processor, cause the first apparatus further to:
   receive a third hybrid automatic repeat request feedback state from the second apparatus, the third feedback state indicating that no inter-UE coordination requests will be accepted by the second apparatus during a predefined period.

12. The first apparatus of claim 2, the at least one memory and the computer program code configured to, with the at least one processor, cause the first apparatus further to:
   receive, from the second apparatus, an instruction to keep monitoring or to skip monitoring of inter-UE coordination requests for one or more members of the group.

13. The first apparatus of claim 12, the at least one memory and the computer program code configured to, with the at least one processor, cause the first apparatus further to:
   receive a coordination message from the second apparatus indicating resource allocation for the second apparatus to receive inter-UE coordination requests or to send coordination messages to one or more group members; and
   take the indicated resource allocation into account when transmitting inter-UE coordination requests or receiving coordination messages from the second apparatus.

14. An apparatus in a communication system comprising at least one processor; and at least one memory including computer program code, the at least one memory and computer program code configured to, with the at least one processor, cause the apparatus to:
   communicate with a group of apparatuses in a group communication utilizing sidelink transmission, where the group of apparatuses comprises a second apparatus configured to coordinate resource allocation for the group communication and at least one other apparatus;
   detect an inter-UE coordination request from a first apparatus among at least one other apparatus of the group, the inter-UE coordination request is transmitted utilizing a designated hybrid automatic repeat request process;
   in response to the detected coordination request, transmit a negative hybrid automatic repeat request acknowledgement based at least on determining a need to transmit an inter-UE coordination request by the apparatus,
   wherein the negative acknowledgement causes the first apparatus to monitor inter-UE coordination requests of the apparatus; and wherein the apparatus transmits the negative hybrid automatic repeat request acknowledgement regardless of whether the inter-UE coordination request was correctly received.

15. The apparatus of claim 14, the at least one memory and the computer program code configured to, with the at least one processor, cause the apparatus further to:

transmit a negative hybrid automatic repeat request acknowledgement based on determining a conflict between the resources indicated in the inter-UE coordination request received from the first apparatus and resources preferred or non-preferred by the apparatus.

16. The apparatus of claim 14, the at least one memory and the computer program code configured to, with the at least one processor, cause the apparatus further to:

in response to the detected coordination request, transmit a positive hybrid automatic repeat request acknowledgement in case the apparatus does not detect a conflict between the resources indicated in the inter-UE coordination request received from the first apparatus and resources preferred or non-preferred by the apparatus or if the apparatus does not have a need to transmit an inter-UE coordination request.

17. The apparatus of claim 14, the at least one memory and the computer program code configured to, with the at least one processor, cause the apparatus further to:

transmit a positive hybrid automatic repeat request acknowledgement to the first apparatus while skipping reception of the inter-UE coordination request, based on operating as a passive listener of the group having no data to transmit for a foreseeable future.

18. The apparatus of claim 14, the at least one memory and the computer program code configured to, with the at least one processor, cause the apparatus further to:

detect the inter-UE coordination request based on received sidelink control information indicating that the first apparatus is transmitting a sidelink transport block to the group utilizing the designated hybrid automatic repeat request process, and skip reception of the sidelink transport block carrying the inter-UE coordination request.

19. The apparatus of claim 18, the at least one memory and the computer program code configured to, with the at least one processor, cause the apparatus further to:

upon receiving sidelink control information of a groupcast sidelink transmission for the group indicating that the designated hybrid automatic repeat request process from the first apparatus is being used, skip further reception of the sidelink hybrid automatic repeat request transmission from the first apparatus and skip transmission of hybrid automatic repeat request feedback to the first apparatus.

20. A method, comprising:

communicating, by a first apparatus of a communication system, with a group of apparatuses in a group communication utilizing sidelink transmission, where the group of apparatuses comprises a second apparatus configured to coordinate resource allocation for the group communication and at least one other first apparatus;

transmitting, utilizing a designated hybrid automatic repeat request process configured by the second apparatus, an inter-UE coordination request;

receiving positive or negative hybrid automatic repeat request acknowledgements from the group of apparatuses in response to transmitting the inter-UE coordination request; and controlling monitoring of inter-UE coordination requests of the at least one other first apparatus based on the received acknowledgements from the at least one other first apparatus, wherein the first apparatus monitors inter-UE coordination requests of the at least one other first apparatus if the acknowledgement received from the at least one other first apparatus was negative, and does not monitor inter-UE coordination requests of the at least one other first apparatus if the acknowledgement received from the at least one other first apparatus was positive;

wherein a negative acknowledgement received from the second apparatus causes the first apparatus to perform a retransmission for the designated hybrid automatic repeat request process, and a negative acknowledgement received from the at least one other first apparatus does not cause the first apparatus to perform a retransmission for the designated hybrid automatic repeat request process; and wherein a positive acknowledgement received from the second apparatus causes the first apparatus to terminate the designated hybrid automatic repeat request process.

* * * * *